April 27, 1948.  A. REICHMAN  2,440,559
DUMP BODY CONTROL MECHANISM
Filed Dec. 11, 1943  2 Sheets-Sheet 2
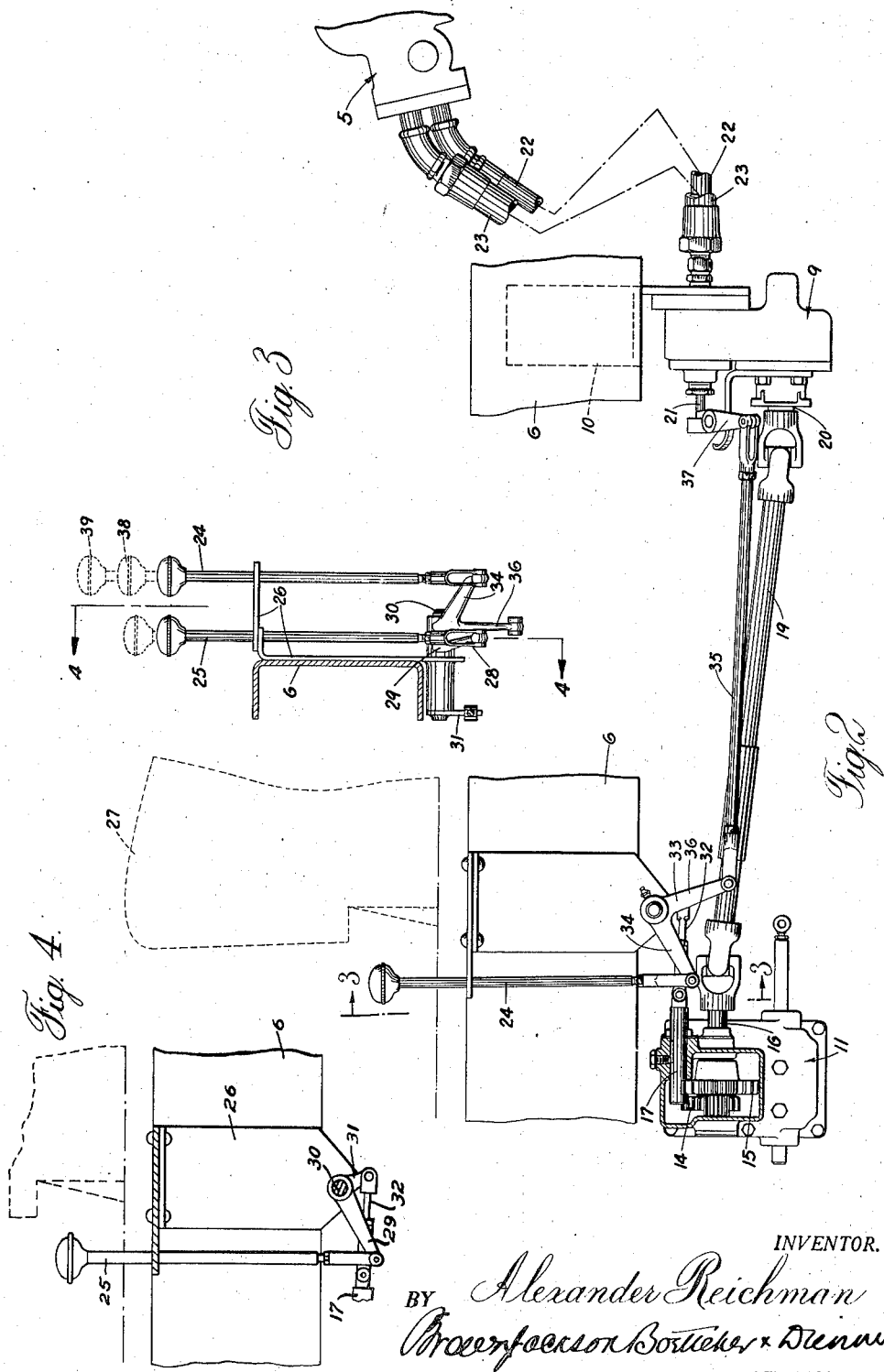
INVENTOR.
BY Alexander Reichman
ATTORNEYS Patented Apr. 27, 1948

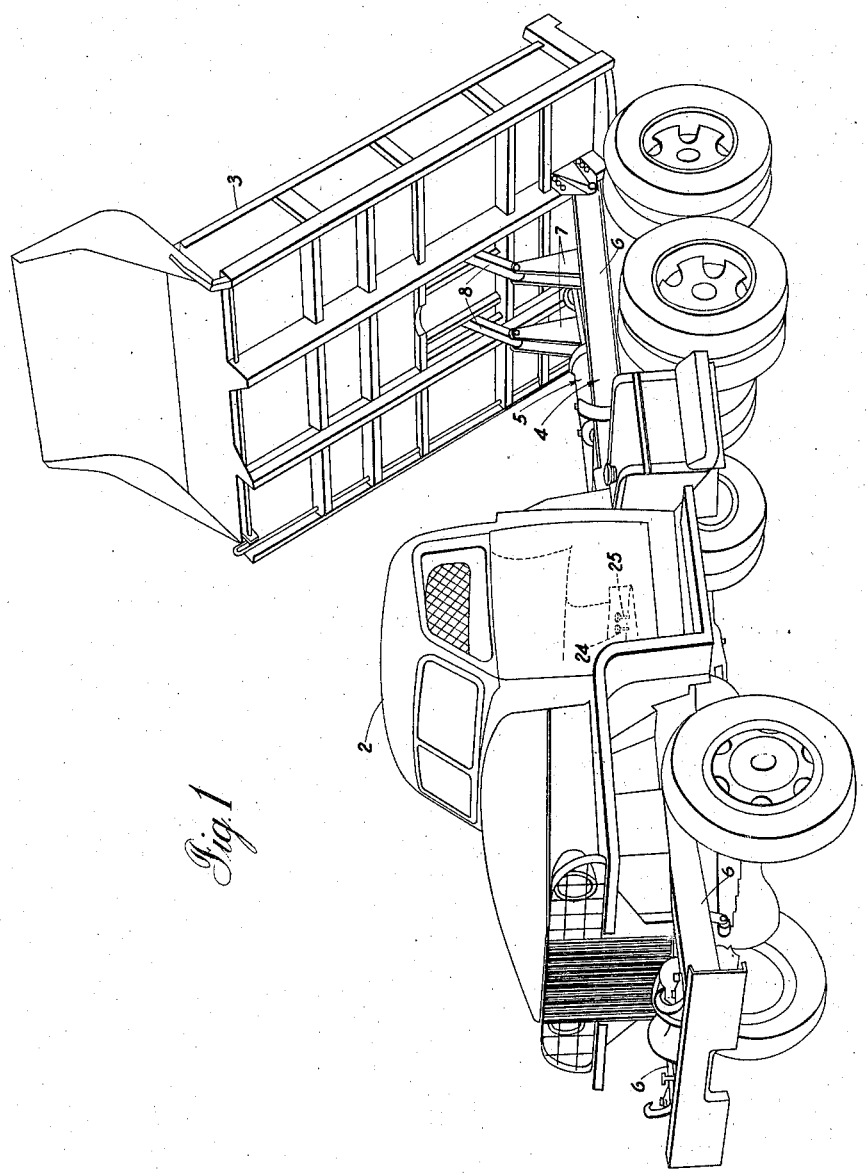

2,440,559

UNITED STATES PATENT OFFICE 2,440,559

DUMP BODY CONTROL MECHANISM

Alexander Reichman, South Bend, Ind., assignor to The Studebaker Corporation, South Bend, Ind., a corporation of Delaware Application December 11, 1943, Serial No. 513,933

7 Claims. (Cl. 298—22)

My present invention relates to a dump body control mechanism. It is well known to provide an arrangement of truck chassis and a dump body therefor movable relative to the chassis into dumping and loading positions. The lifting means for the dump body generally comprises a hydraulic piston and cylinder means to which fluid under pressure is adapted to be delivered by a suitable pump which in turn is driven by a power takeoff mechanism incorporated in the vehicle. In such type of vehicle, means must be provided for selectively connecting or disconnecting the power takeoff mechanism with the pump, and a second means for selectively controlling flow of fluid from the pump to and from the piston and cylinder means to position the body in dumping position, or to permit the latter to return to its normal position. In the present form of structures, the several mechanisms referred to occupy a large amount of space which has required a rather complex arrangement of the operating levers and connecting shafts between the several mechanisms.

It is an object of my invention to provide a simple arrangement of control mechanism for a vehicle of the character indicated, which arrangement provides for convenient disposal of the operating levers in the cab of the vehicle.

I propose to provide a pair of shift levers mounted for vertical movement, and preferably disposed with their upper ends extending through the floor of the cab and slightly forward of the seat in the cab where they may be conveniently grasped by the driver in his normal seated position. One of the two levers is arranged for selectively controlling actuation of the power takeoff mechanism carried by the chassis, and the other lever having means suitably connecting it to the pump of the hydraulic lifting mechanism and operable to provide for the admission of fluid under pressure into the piston and cylinder means, or to allow the return of fluid from the piston and cylinder means to the reservoir of the pump.

A preferred feature of my invention resides in a provision of a shaft supported by a bracket fixed to the chassis which shaft is adapted to be rotated by actuation of the lever for connecting the power takeoff mechanism to drive the pump. The other lever controlling flow of fluid to and from the pump to the piston and cylinder lifting means is connected to one arm of a bell crank lever journaled on the shaft above referred to with the other arm of the bell crank lever being connected to a rod for controlling the position of the valve means in the pump.

Now in order to acquaint those skilled in the art of the manner of constructing and utilizing a control mechanism in accordance with my invention I shall describe in conjunction with the accompanying drawings a preferred embodiment of the same.

In the drawings:

Figure 1 is a perspective view of a dump truck in which my invention has been incorporated;

Figure 2 is a side elevational view of a control mechanism of my invention showing its relation to the chassis of the vehicle, and illustrating in dotted lines the position of the seat in the cab relative to the control mechanism and with a portion of the case of the power takeoff mechanism in section;

Figure 3 is a detailed vertical sectional view taken substantially on the line 3—3 of Figure 2 looking in the direction indicated by arrows; and Figure 4 is a detail view of a portion of the control means of my invention taken substantially on the line 4—4 of Figure 3 looking in the direction of the arrows.

Referring now to Figure 1, there is shown a conventional dump truck which comprises a cab 2 and a dump body 3. The dump body is of the form pivoted about a horizontal axis rearwardly of the chassis 4. A piston and cylinder mechanism 5, is disposed to extend lengthwise of and parallel with the spaced longitudinal frame members 6—6 of the chassis. Suitable levers 7 and 8 innerconnect the cylinder and piston mechanism 5 to position the dump body 3 in dumping position as shown in Figure 1. The structure of the piston and cylinder mechanism 5, the dump body 3 and the innerconnecting linkage may be of any conventional form known in the art.

Referring now to Figure 2, a pump 9, is supported by a bracket 10, connected to one of the longitudinal channel members 6 of the chassis. A power takeoff mechanism 11, is supported by the transmission case of the vehicle in a manner well known in the art. The power takeoff mechanism 11 is of conventional design and comprises a pair of gears 14 and 15, in which the gear 15 is mounted for transverse movement upon a splined shaft for meshing engagement with the gear 14 to establish drive to the driven shaft 16 of the mechanism. Shifting of the gear 15 is accomplished by sliding movement of a gear rail 17. As shown the gear rail 17 adjacent its forward end is provided with a recessed portion fitting over the periphery of the gear 15 for permitting the latter to rotate and yet providing a connection for shifting it axially on the splined shaft 16.

The pump 9 is also of conventional construction and is adapted to be driven by the propeller shaft 19, the opposite ends which are provided with universal connecting coupling elements having connection with appropriate universal coupling elements connected to the shaft 16 and the shaft 20. The latter shaft extends into the pump housing and rotation thereof drives the pump to deliver fluid under pressure to the piston and cylinder mechanism 5. The pump 9 is further provided with a shaft 21 rotatable about a horizontal axis extending generally lengthwise of the vehicle for positioning suitable internal valve mechanism to provide for delivery of fluid under pressure to the conduit 22 leading to the piston and cylinder mechanism 5 to force the piston longitudinally outwardly of the cylinder lifting the dump body 3 to its dumping position, as shown in Figure 1. The shaft 21 is actuatable to a second position permitting flow of fluid from the piston and cylinder mechanism 5 to return to the reservoir of the pump 9 through a conduit 23 to permit the dump body 3 to lower. The structure so far described is all conventional in the art and is believed to be sufficient for the purposes of the present disclosure.

Referring now to Figures 2, 3 and 4 showing the control mechanism of my invention, it will be observed that I provide a pair of shift levers 24 and 25 which are guided for vertical movement in a bracket 26 which is suitably secured to the channel member 6 of the chassis substantially immediately below the driver's seat 27. The lever 25 has suitably secured to its lower end a clevis 28 to which one end of an arm 29, is pivotally connected. The other end of the arm 29 is suitably secured to a shaft 30 rotatably supported relative to the bracket 26. The shaft 30 at its end disposed inwardly of the frame member 6 has an arm 31 suitably secured thereto. A rod 32 having a clevis at either end thereof is secured at one end to the arm 31 and at its other end to the gear rail 17. The arm 29 and arm 31 in effect form a bell crank means between lever 25 and rod 32. Thus it will be observed that by grasping the upper end of lever 25, and pulling it vertically upwardly the shaft 30 will be rotated in a clockwise direction which causes the gear rail 17 to move to the left as viewed in Figure 2 engaging the gears 14 and 15 of the power takeoff mechanism 11 and thereby driving the pump 9 through the propeller shaft 19.

The shift lever 24 is provided with a clevis at the lower end thereof which has pivotal connection with the arm 34 of the bell crank lever 33 with the other arm 36 of the bell crank pivotally connected with clevis at one end of a rod 35. The other end of rod 35 is suitably connected to a known form of valve control lever 37. The lever 37 and the shaft 21 are suitably interconnected so that when the lever 24 is lifted vertically upwardly to the position indicated in dotted lines at 38, the valve shaft 21 is rotated to provide a fluid connection between the pump and the high pressure inlet conduit 22 leading to the piston and cylinder mechanism 5. When the shift lever 24 is actuated to its next position by further vertical lifting movement being imparted thereto bringing it to the dotted line position indicated at 39, the valve shaft 21 will position the valve mechanism within the pump 9 to establish connection between the cylinder of the piston and cylinder mechanism 5 with the reservoir of the pump to permit the dump body 3 to lower by return of fluid through conduit 23.

In the normal operation of the control mechanism, the lever 25 will be first actuated to set the pump into operation after which the lever 24 will be actuated to cause the dump body to assume dumping position. After the load has been dumped lever 24 is shifted to the position indicated by the reference character 39 to permit the dump body to return to normal position. Upon return of the dump body to normal position both levers 24 and 25 are returned to the full line positions as shown in Figure 3, by forcing both levers vertically downwardly.

Preferably the bracket 26 for supporting the control levers 24 and 25 is positioned relatively to the driver's seat at the side thereof which the driver occupies in operating the vehicle, so that the upper ends of the levers 24 and 25 extend through the floor of a cab a short distance forwardly of the seat where they may be conveniently grasped by the operator in sitting position. The levers in this position are out of the way of the brake and clutch mechanism and shifting levers of the transmission of the vehicle and do not interfere with normal operation of the truck. It will be observed that mounting of the levers 24 and 25 to have vertical movement provides for convenient operation of the dumping mechanism by the operator of the vehicle.

While I have shown what I consider to be the preferred embodiment of my invention, it will be understood that various rearrangements and modifications may be made therein without departing from the spirit and scope of the invention.

I claim:

1. For use in a dump vehicle having a chassis, a dump body provided with hydraulically operable means for moving said dump body relative to said chassis, a pump for controlling flow of fluid to and from said hydraulically operable means, and a power takeoff mechanism, control means comprising a pair of shift rods, means for mounting said shift rods for movement substantially vertically relative to said chassis, means including a bell crank associated with one of said shift rods for connecting the same with said power takeoff mechanism for controlling operation of the latter by vertical movement of said shift rod, and means including a bell crank associated with the other of said shift rods for connecting the same with said pump to control operation of the latter by vertical movement of said other shift rod.

2. For use in a dump vehicle having a chassis, a dump body provided with hydraulically operable means for moving said dump body relative to said chassis, a pump for controlling flow of fluid to and from said hydraulically operable means, and a power takeoff mechanism, control means comprising the combination of a pair of shift rods, means including a guide bracket for mounting said shift rods for vertical movement relative to said chassis, a shaft rotatably supported by said bracket, means connecting one of said shift rods to said shaft whereby vertical movement of said one shift rod causes rotatable movement of said shaft, means extending from said shaft to said power takeoff mechanism and shiftable upon vertical movement of said one shift rod to control operation thereof, a bell crank journaled on said shaft and having an arm thereof pivotally connected to the other of said shift rods, and means between the other arm of said bell crank and said pump to control operation of the latter by vertical movement of said other shift rod.

3. For use in a dump vehicle having a chassis, a cab, a seat in said cab, a dump body provided with hydraulically operable means for moving said dump body relative to said chassis, a pump for controlling flow of fluid to and from said hydraulically operable means, and a power takeoff mechanism, control means comprising a pair of shift rods, guide means for said shift rods for guiding the same for vertical movement with respect to said chassis, said guide means and said shift rods being arranged relative to said chassis and said cab so that said rods are adapted to be disposed with their upper ends extending into said cab in juxtaposition of the forward transversely extending edge of said seat, means associated with one of said shift rods for connecting the same with said power takeoff mechanism for controlling operation of the latter by vertical movement of said one shift rod, and means associated with the other of said shift rods for connecting the same with said pump to control operation of the latter by vertical movement of said other shift rod.

4. The control means of claim 2 wherein the first mentioned means includes a shifter rail extending into the power takeoff mechanism shiftable by actuation of said one rod to engage or disengage the power takeoff mechanism with the means connecting the latter with said pump.

5. For use in a dump vehicle wherein there is a chassis having a dump body provided with hydraulically operable means for moving said dump body relative to said chassis, a pump for controlling the flow of fluid to and from said hydraulically operable means, and a power takeoff mechanism, control means comprising a pair of shift rods, means for mounting said shift rods for rectilinear movement with respect to said chassis, means including a bell crank for connecting one of said shift rods with said power takeoff mechanism for controlling the latter by rectilinear movement of said one shift rod, and means including a bell crank for connecting the other of said shift rods with said pump for controlling operation of the latter by rectilinear movement of said other shift rod.

6. For use in a dump vehicle wherein there is a chassis having a dump body provided with hydraulically operable means for moving said dump body relative to said chassis, and a pump for controlling the flow of fluid to and from said hydraulically operable means, control means comprising a shift rod, means for mounting said shift rod for rectilinear movement relative to said chassis, and means including a bell crank connecting said shift rod with said pump means for controlling operation of the latter by rectilinear movement of said shift rod.

7. For use in a dump vehicle wherein there is a chassis having a dump body provided with hydraulically operable means for moving said dump body relative to said chassis, and a power takeoff mechanism, control means comprising a shift rod, means for mounting said shift rod for rectilinear movement with respect to said chassis, and means including a bell crank for connecting said shift rod with said power takeoff mechanism for controlling operation of the latter by rectilinear movement of said shift rod.

ALEXANDER REICHMAN.

REFERENCES CITED

The following references are of record in the file of this patent:

UNITED STATES PATENTS

| Number | Name | Date |
|---|---|---|
| 1,157,749 | Young | Oct. 26, 1915 |
| 1,332,008 | Sparks | Feb. 24, 1920 |
| 1,358,675 | Schmitt | Nov. 9, 1920 |
| 2,162,831 | Barrett | June 20, 1939 |